Dec. 4, 1928.
S. R. ALLEN
1,693,633
CONVERTIBLE GO-CART AND CRIB
Filed April 1, 1927
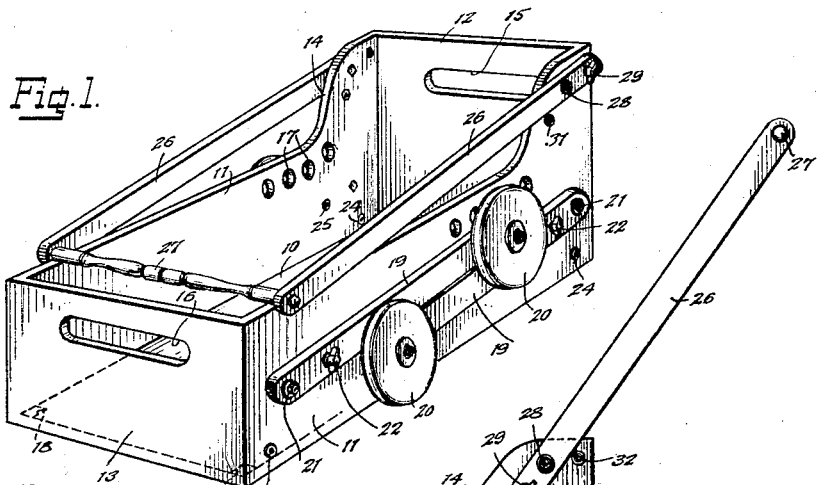
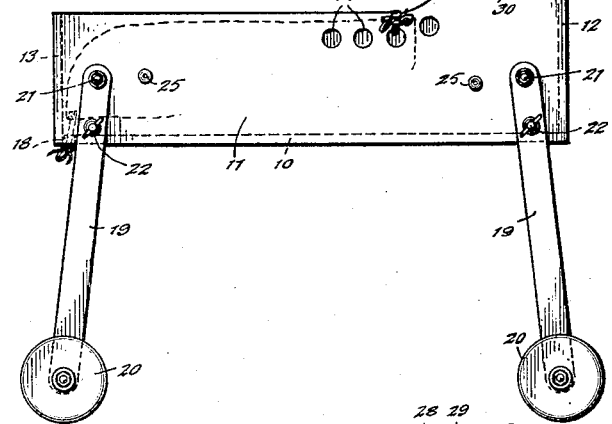
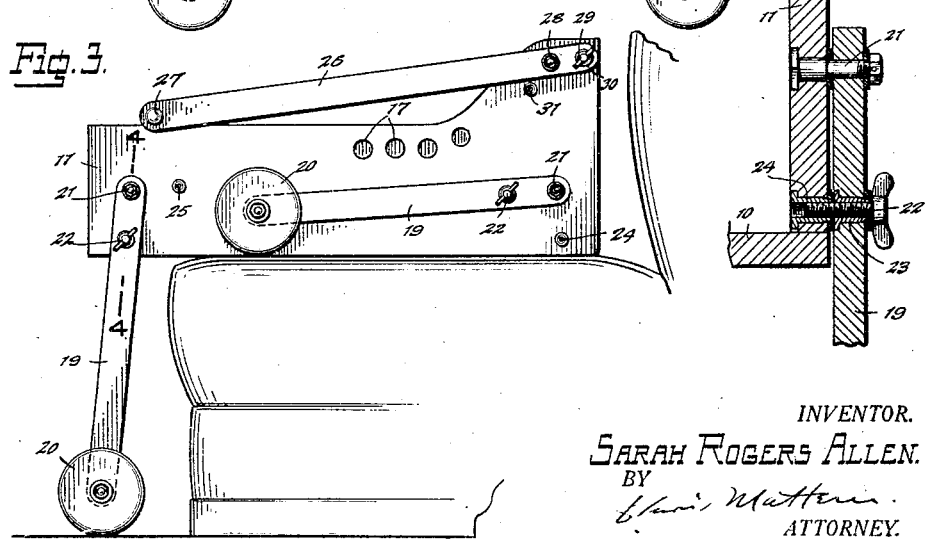
INVENTOR.
SARAH ROGERS ALLEN.
BY
ATTORNEY.

Patented Dec. 4, 1928.

1,693,633

UNITED STATES PATENT OFFICE.

SARAH ROGERS ALLEN, OF BETHEL, CONNECTICUT.

CONVERTIBLE GOCART AND CRIB.

Application filed April 1, 1927. Serial No. 180,120.

The present invention relates to a convertible go-cart and crib, particularly adapted for use in an automobile, an object being to provide a simple, comfortable, safe and reliable conveyance for an infant, and which may be conveniently carried in an automobile or other vehicle, so that it takes up very little room, and is firmly supported in such manner that the infant may ride facing forward in a natural, hygienic, and comfortable position. It is also an object to provide a device of this character which will not be subject to swinging, excessive vibration, or other movements likely to be harmful to the health of the infant, and to this end it is particularly proposed to provide a firm support for the device with relation to the automobile.

A further object is to provide a structure having front and rear wheeled leg-supports, pivotally mounted on the sides of the body in a manner to be independently secured in either extended or folded positions, and adapted in the latter position to be entirely free of the flat base of the body structure, so that the device may rest firmly on the seat or other support, without damaging it.

Another object is to provide a handle, also pivotally mounted on the sides of the body structure, and adapted to be secured in either extended or folded relation, and which, when folded, will serve as a guard.

Other objects are to provide means for adjustably tying a cover in place, so as to safely retain the infant, and hand-holds by which the structure may be conveniently lifted and carried about.

With the above and other objects in view an embodiment of the invention is shown in the accompanying drawings, and this embodiment will be hereinafter more fully described with reference thereto, and the invention will be finally pointed out in the claims.

In the drawings:—

Fig. 1 is a perspective view of a convertible go-cart and crib, according to the present embodiment of my invention, and showing the same in completely folded relation;

Fig. 2 is a side elevation of the same, showing it in its relation for use as a go-cart to be wheeled about;

Fig. 3 is a side elevation showing it in its folded relation for use in an automobile; and Fig. 4 is a detail enlarged sectional view, taken along the line 4—4 of Fig. 3.

Similar reference characters indicate corresponding parts throughout the several figures of the drawings.

Referring to the drawings, the convertible go-cart and crib, according to the present embodiment of the invention, comprises a box-like body including a flat base 10, longitudinal sides 11, 11, a head end 12, and a foot end 13, the head end being higher than the foot end, and the sides being curved upwardly at their upper edges adjacent the head end, as at 14, to provide a protecting enclosure for the head of the infant, and at the same time to provide a mounting structure for the handle, as will hereinafter more fully appear. The head and foot ends are respectively provided with hand-hold slots 15 and 16 to enable the structure to be conveniently lifted, as when placing it in and removing it from the automobile. In each side there are provided a series of holes 17 adapted for adjustably tying a cover in place, or a strap or ribbon may be threaded through them to serve as a guard. At the forward corners of the base 10 holes 18 are formed, and may have cover straps inserted through them and tied at the under side, as clearly illustrated in Fig. 2.

The wheeled leg-supports are similarly provided at each side near the head and foot ends, and each consists of a bar 19, provided at its lower end with a wheel 20 disposed at the outer side, said bar being pivotally mounted at its upper end upon a shouldered stud-bolt 21 secured in the side of the body at a point substantially midway between the upper and lower edges. The leg-supports are adapted to be swung from their projected or extended position, as shown in Fig. 2, and in which they are in slightly diverging relation to each other, to their folded position, as shown in Fig. 1, in which they are diagonally disposed in nested overlying relation entirely within the planes of the upper and lower edges of the sides, and in either of these positions are adapted to be securely fixed in place. For this purpose, the leg-supports are each provided with a wing-headed screw bolt 22 engaged in a threaded bushing 23 in the leg-support, and adapted to be screwed into one or the other of two similar threaded bushings 24 and 25 provided in the side of the body at such points that they position and rigidly secure the leg-supports with respect to the body. Obviously, the screw bolt is turned out sufficiently to disengage it from the bushing in the body when it is desired to swing the leg-support to either folded or extended position, and when so positioned the bolt is screwed into the corresponding bushing.

The handle comprises side arms 26 and a transverse hand-grip bar 27, and is mounted on the body sides at the upper raised corner of the head end in a somewhat similar manner to the mounting of the leg-supports, being adapted to be swung from an extended position, as shown in Fig. 2, to a folded position, as shown in Figs. 1 and 3, and rigidly secured in either of these positions. The arms are pivotally mounted in spaced relation to the ends upon shouldered stud bolts 28 secured in the sides, and preferably of similar design to the stud bolts 21, and at their ends are each provided with a wing headed screw bolt 29 engaged in a threaded bushing 30 in the arm and adapted to be screwed into one or the other of two threaded bushings 31 and 32 secured in the body side at such points as to respectively position and rigidly secure the handle in its extended and folded positions. The bushings 30, 31 and 32 are preferably of similar design to the bushings 23, 24 and 25 for the leg-supports.

As shown in Fig. 1 the structure is completely folded, and may be conveniently carried about, and when not in use may be stored in a very small space. In Fig. 2 I have shown the same with the legs and handle extended, in which relation it constitutes a go-cart; and in Fig. 3 I have shown its use in an automobile. In this latter capacity the rearward leg-supports and the handle are folded, so that the base of the body structure rests squarely upon the automobile seat, without any projecting structure that might damage the upholstery. The forward leg-supports are extended and rest on the floor, thereby firmly supporting the body structure and allowing it to be moved as far forward on the seat as desired. The folded handle serves as a guard. Due to the firm support of the structure it is not subjected to the swinging and vibratory movements usually experienced with hammocks or the like, and which movements are apt to prove injurious to the health of the infant. In a single-seated car, with two persons riding in the seat, the go-cart crib may be conveniently placed between them, without obstructing the forward space or interfering with the operation of the car.

The structure is of very simple, sturdy, and inexpensive construction, may be easily cleaned, and is free of any detachable parts that may become lost or misplaced. Its conversion from go-cart to automobile crib, or to entirely folded relation, is extremely simple, and may be done without disturbing the infant.

I have illustrated and described a preferred and satisfactory embodiment of the invention, but it will be obvious that changes may be made therein, within the spirit and scope thereof, as defined in the appended claims.

Having thus described my invention, what I claim and desire to secure by Letters Patent is:—

1. In a convertible go-cart crib, a body portion having a base, longitudinal sides, and transverse head and foot ends, front and rear leg-supports at each side having wheels at their lower ends disposed at their outer sides, and pivotally mounted at their upper ends outwardly of the longitudinal sides of said body portion, and adapted to be swung from extended relation to folded overlying relation with respect to each other, the wheel of each leg support partially overlying the adjacent other leg-support in said folded relation, whereby the wheel of one leg-support retains the other leg support, the upper edge of the lower leg-supports in said folded relation being parallel to and supporting the lower edge of the upper leg-supports; and means carried by each leg support for rigidly securing said leg supports in their respective extended and folded relation.

2. In a convertible go-cart crib, a body portion having a base, longitudinal sides, and transverse head and foot ends, leg-supports having wheels at their lower ends and movably supported with relation to said body portion to be moved from extended relation to folded relation at each side of the body portion, means for rigidly securing said leg supports in their respective extended and folded relation, a handle comprising side arms and a transverse hand grip portion, said side arms being pivotally mounted at their ends upon the sides of said body portion and adapted to be swung from extended relation to folded relation, and constituting a guard over said body portion in said folded relation, and means for rigidly securing said handle in its respective extended and folded relation.

Signed at Bridgeport, in the county of Fairfield, and State of Connecticut, this 29th day of December, 1926.

SARAH ROGERS ALLEN.